(12) United States Patent
Bomba (10) Patent No.: US 10,890,440 B2
(45) Date of Patent: Jan. 12, 2021

(54) 3D FLOATING SUPPORT SYSTEM AND RELATED GEOMETRY-DETECTING MACHINE OF SLENDER ARTICLES

(71) Applicant: RDE COMPANY S.R.L., Milan (IT)

(72) Inventor: Gabriele Bomba, Milan (IT)

(73) Assignee: RDE COMPANY S.R.L., Milan (IT)

( * ) Notice: Subject to any disclaimer, the term of this patent is extended or adjusted under 35 U.S.C. 154(b) by 0 days.

(21) Appl. No.: 16/685,127

(22) Filed: Nov. 15, 2019

(65) Prior Publication Data
US 2020/0116476 A1 Apr. 16, 2020

Related U.S. Application Data

(62) Division of application No. 16/090,436, filed as application No. PCT/IB2017/051770 on Mar. 28, 2017.

(30) Foreign Application Priority Data

Apr. 1, 2016 (IT) .......................... 102016000033750

(51) Int. Cl.
*G01B 11/245* (2006.01)
*G01B 11/24* (2006.01)
(Continued)

(52) U.S. Cl.
CPC ............ *G01B 11/245* (2013.01); *G01B 7/345* (2013.01); *G01B 11/24* (2013.01); *G01B 7/293* (2013.01)

(58) Field of Classification Search
CPC ...... G01B 11/245; G01B 7/345; G01B 11/24; G01B 7/293; G01B 5/0004; G01B 5/0009; G01D 11/16
(Continued)

(56) References Cited

U.S. PATENT DOCUMENTS 3,742,569 A * 7/1973 Moehlenpah ........... B27F 7/155
227/143
4,593,476 A * 6/1986 Clark ..................... G01B 5/207
33/529

(Continued)

FOREIGN PATENT DOCUMENTS

CN 102221354 A 10/2011
DE 40 09 144 A1 9/1990
(Continued)

OTHER PUBLICATIONS

International Search Report and Written Opinion, dated Aug. 8, 2017, from corresponding PCT application No. PCT/IB2017/051773.

(Continued)

*Primary Examiner* — Yaritza Guadalupe-McCall
(74) *Attorney, Agent, or Firm* — Nixon & Vanderhye (57) ABSTRACT

A support system of a slender article in a geometry-detecting machine includes a plurality of vertical constraint points with which the slender article is in contact, wherein the vertical constraint points are coupled in pairs by interconnection arms in turn including a constraint joint provided with a universal joint mechanism which leaves, to the arms, two rotational degrees of freedom along two orthogonal axes passing in the proximity of the longitudinal axis of the article, the constraint joints possibly being themselves similarly coupled in pairs until converging, in a multiple-layer sequence, towards a single constraint point.

4 Claims, 8 Drawing Sheets

(51) Int. Cl.
  *G01B 7/34* (2006.01)
  *G01B 7/293* (2006.01)
(58) Field of Classification Search
  USPC ............................................ 33/551; 356/601
  See application file for complete search history.

(56) References Cited

U.S. PATENT DOCUMENTS

| | | | |
|---|---|---|---|
| 4,851,760 A | | 7/1989 | Luebke |
| 5,024,002 A | * | 6/1991 | Possati ..................... B23Q 1/01 248/676 |
| 5,040,716 A | * | 8/1991 | Stetz .................... B23K 37/053 228/42 |
| 5,289,261 A | | 2/1994 | Yogo et al. |
| 5,949,086 A | | 9/1999 | Reponen et al. |
| 6,145,212 A | * | 11/2000 | Geise ..................... G01B 5/207 33/529 |
| 6,427,353 B1 | * | 8/2002 | Nelson ..................... G01B 5/00 33/542 |
| 7,024,952 B2 | * | 4/2006 | Huynh .................... B23P 19/04 73/865.8 |
| 7,103,985 B1 | * | 9/2006 | Phillips ..................... G01B 3/14 33/549 |
| 7,110,910 B1 | | 9/2006 | Deffenbaugh et al. |
| 7,225,665 B2 | | 6/2007 | Goforth et al. |
| 7,243,438 B2 | * | 7/2007 | Jaubert .................... G01B 3/14 269/311 |
| 7,266,234 B2 | | 9/2007 | Ciani |
| 7,509,218 B2 | | 3/2009 | Hoysan et al. |
| 7,676,944 B2 | * | 3/2010 | Kato ..................... G01B 5/207 33/551 |
| 7,856,895 B2 | | 12/2010 | Syassen |
| 10,514,252 B2 | * | 12/2019 | Bomba .................. G01B 11/24 |
| 2004/0184650 A1 | | 9/2004 | Ciani |
| 2007/0028681 A1 | | 2/2007 | Goforth et al. |
| 2008/0120044 A1 | | 5/2008 | Hoysan |
| 2009/0031824 A1 | | 2/2009 | Syassen |
| 2019/0120615 A1 | * | 4/2019 | Bomba .................. G01B 7/345 |
| 2019/0120616 A1 | * | 4/2019 | Bomba .................. G01B 5/0009 |
| 2020/0116476 A1 | * | 4/2020 | Bomba .................. G01B 11/24 |
| 2020/0122221 A1 | * | 4/2020 | Bomba .................. B21C 51/005 |

FOREIGN PATENT DOCUMENTS

| | | |
|---|---|---|
| DE | 10 2006 002 093 A1 | 7/2007 |
| EP | 0 352 247 A1 | 1/1990 |
| EP | 1447645 A1 | 8/2004 |
| EP | 1 915 323 A1 | 4/2008 |
| EP | 1 974 179 A2 | 10/2008 |
| EP | 2 057 438 A2 | 5/2009 |
| EP | 2 527 785 A1 | 11/2012 |
| EP | 2 803 942 A1 | 11/2014 |
| GB | 2 259 764 A | 3/1993 |
| JP | S59-34109 A | 2/1984 |
| JP | S59-188507 A | 10/1984 |
| JP | S61-283804 A | 12/1986 |
| JP | H06-331339 | 12/1994 |
| JP | H06-331339 A | 12/1994 |
| WO | 96/34251 A1 | 10/1996 |
| WO | 2006/138220 A1 | 12/2006 |
| WO | 2007/018902 A1 | 2/2007 |
| WO | 2007/082740 A2 | 7/2007 |
| WO | 2008/063550 A2 | 5/2008 |

OTHER PUBLICATIONS

International Search Report and Written Opinion, dated Aug. 23, 2017, from corresponding PCT application No. PCT/IB2017/051770.

\* cited by examiner

3D FLOATING SUPPORT SYSTEM AND RELATED GEOMETRY-DETECTING MACHINE OF SLENDER ARTICLES

FIELD OF THE INVENTION

The present invention relates to a support and three-dimensional balancing system of slender, generally skewed, articles to be used for the accurate detection of their geometric shape.

TECHNOLOGICAL FIELD OF THE INVENTION

As is known, the mechanical manufacturing industry makes extensive use of slender semifinished products, generally made of metal and other materials, for the manufacture of more complex products. In particular, for the turning and moulding processes, without limitation thereto, slender semifinished products having different types of section (round, square, hexagonal, etc.) are widely used.

The characteristics of the slender semifinished products are related to four main areas: geometry of the product, chemical and physical composition of the material, surface finish and chemical, physical and mechanical characteristics. In each of the above-mentioned areas, established specifications are a compromise between the manufacturing issues of the product, the cost for the achievement of said characteristics and the actual needs of the subsequent processes, determined both by machining processes and by the requirements of the final application.

The most common semifinished products in the engineering industry, without limitation thereto, are products in the form of bars intended for turning and/or moulding, usually having a length of 3 meters which provides a good compromise between handling of the semifinished product and amount of semifinished product to be treated for each processing cycle. Also, it is possible to find longer bars, up to 4, 5 or 6 meters, above which stock management and transport become difficult, or shorter bars, for which the time spent to load the bar to be processed is disadvantageous. These articles are commonly marketed in various materials, both metallic (steel, brass, aluminium, titanium, etc.) and polymeric (polyethylene, polypropylene, PVC, Teflon, etc.) and non-metallic (ceramic, glass, composite or sintered materials etc.).

For the scope of this invention it is necessary to deepen the subject of the geometry of the semifinished product. The bars have a slender cylindrical geometry, i.e. the dimensions of the base are "small" with respect to the height of the cylinder. The most common shapes of the base are circle, hexagon, square and rectangle; they can be either solid (bars) or hollow (tubes) and are required for processes where the user takes advantage of the savings due to the execution of the section shape. For example, the round section is used for threads, shafts etc.; the hexagonal section for nuts, bolts etc. Remarkable importance is given to the respect of the dimensional specifications because, if such characteristics are guaranteed by the manufacturer, the user will be actually able to avoid processes to obtain the right size to the specific article; for example, in the case of round-sectional bars, they are produced and marketed also with h7 tolerance, with very low circularity errors, allowing to realize finite shafts by simply cutting and processing the workpiece end.

The main processings made on these semifinished products are lathe machining. The turning technologies are evolving very quickly and performances, in terms of rotation speed and cutting features of tools, are considerably increasing. During turning, the bar is loaded on a machining axis on the back of the lathe and is set in rotation accordingly for the entire length, as the machine performs a turning operation. The most modern machines are able to perform machining with rotational speeds of 5,000, 8,000 or even 10,000 revolutions per minute, depending on the workability of the material. These rotational speeds are considerable and require that the semifinished product to have a very accurate "straightness", in order to minimize problems of vibration and, ultimately, of machining precision.

In order to have a method to unify the evaluation of the "straightness", regulators have agreed for several years some definitions that will be referred to below, and have gathered them into the European standard EN 12164. This standard defines (for semifinished products in bars having a diameter from 10 mm to 50 mm and a length greater than 1000 mm) that the deviation from straightness is the curvature (arc depth) with respect to a given theoretical line when the semifinished product lies on a horizontal plane; this standard also indicates the limit values, which should not be exceeded, in mm/m: in the common jargon, a fraction of the "DIN" (meant as a reference to the norm EN12164DIN, i.e. the German transposition of the European standard) simplistically represents a level of quality, with respect to straightness, of the same article (⅓ DIN is a better quality of ½ DIN, and so on).

After several years of engineering studies on technological issues related to the straightness of the articles, the Applicant concluded that the above-mentioned standard cannot be considered suitable nowadays to outline significant values of "straightness" for the current technological production levels. The standard states that the detection of the arc must be made when the semifinished product is lying on a flat surface without taking into account that the established maximum curvatures—that the modern manufacturing processes even tend to discard—are almost cancelled by the effect of resting on the reference plane due to the transverse friction: the actual deviations are therefore almost undetectable. The relationship between the density and Young's modulus, especially of metal alloys, is such as to cause that the deformation due to its own weight is far higher to the curvatures examined for qualitative purposes.

Basically, if a product lies on a flat surface, this product tends to present a flat conformation despite its curvature, thus making it impossible to determine it, just as outlined in the standard. In a similar way, on the horizontal plane, friction becomes predominant with respect to the possibility of the elastic return imposed by the small curvatures to be examined.

The issue of straightness was explored technologically in many fields, especially when the slenderness of the products causes the relationship of density to Young's modulus and/or density to bearing friction to be unfavourable. This issue has always been an important engineering and development theme for technical solutions for measuring and analysis on products, both for quality control and for process control purposes.

In the prior art, there are several interesting embodiments aimed at measuring the straightness, both in terms of flatness and in terms of straightness. We find solutions and applications focused on more or less original methods of application of detection sensors, such as for example in the documents EP 2527785, CN 102221354, EP 0352247, EP 1447645, WO2006138220, WO9634251 or JP 61283804, where the mode of supporting the product is, however, not considered during measurement; obviously, these methods are convenient in applications where the relationship between density and Young's modulus or between density and friction is favourable (for example in articles realized in carbon fibre composite), which often does not occur in case of slender metallic articles.

Other solutions have been proposed focusing on how the product is supported with arrangements designed to control the action actuated by vertical supports in terms of force and displacement on the semifinished product to be measured. There are various methodologies, with load cell mechatronic approaches as in the case of EP 2057438 or EP 1974179; with physical approaches such as the physical floating in a fluid of the same density as in the case EP 1915323 or JP 063331339; or with fluidic approach as in the case JP 55934109, where the slender body is supported on a "bed" of isobar fluidic actuators. All the above-mentioned prior art, however, provides solutions mainly oriented to precision, as in the case of the application of the sensors, or where the aim is to obtain an accurate measure through the suspension of the article, in any case, by placing the focus on the unique attempt to balance the negative effects of gravity on the measurement of the article.

EP 2803942 also discloses a complex supporting system of slender articles, which simply faces the need to manage a plurality of articles.

SUMMARY OF THE INVENTION

The purpose of the present invention is to overcome the limitations of the prior art by providing a support system for slender articles allowing the same to freely assume their geometric shape, regardless of external constraints, so as to be able to measure the real geometry of the pieces.

This object is achieved with a system as described in its essential features in the attached main claim. Other preferable aspects are described in the dependent claims.

BRIEF DESCRIPTION OF THE FIGURES

Further features and advantages of the invention will anyhow be more evident from the following detailed description of a preferred embodiment, given by mere way of nonlimiting example and illustrated in the accompanying drawings, wherein.

DESCRIPTION OF THE CURRENTLY PREFERRED EMBODIMENTS

The long research carried out for finding a workable solution to fulfil the purpose of performing measurements which are precise, accurate and industrially advantageous has led the Applicant to conceive a particular solution that overcomes the limitations of the known art. To better get into the specifics of the solution, it is necessary to make a small digression on precision and accuracy.

The precision of a measurement is defined by the statistical dispersion of the detected values compared to the average value of the measurements; a more precise measurement of another measurement will have less distant values from the average value of the same values, with respect to a less precise measurement that will have more scattered values, i.e. with a greater standard deviation. In the general technique, precision is linked to the quality of the used sensor with respect to the expected resolutions for the determination of the physical quantity to be examined: for example, a laser triangulation feeler is more precise than a mechanical feeler with position detection (for example of the resistive type). On the other hand, accuracy relates to another aspect of the measurement, i.e. the distance of the detected value, single or average, compared to the actual value. The latter concept is an essential point for the system shown here, as the object of the application is to provide a device capable of obtaining a value, which is as close as possible to the actual value, as only this value can be used both for quality control analysis, and for process control activities.

The first consideration to be made is that in a slender article not complying with straightness conditions, the site of the centres of the sections composing the article constitutes a skew curve, i.e. a geometric site whose osculating planes lie on several levels. The production processes of the articles are such that the osculating planes tend to be slightly divergent, but the experimental experience has shown that even minor modifications of these planes tend to degrade the accuracy of the measurement.

In differential geometry, a theorem is known (fundamental theorem of the theory of curves in space) stating that if a parameterized curve with respect to the arc length with curvature and torsion exists, such a curve is unique, except for rigid motions in space. This theorem makes us understand the importance of considering the slender and skewed bodies as a development of a curvature, rather than as simple Cartesian representations; this mathematical concept has prompted the Applicant to consider that, by suspending a slender and skewed article in space with a device capable of accommodating the curvatures of the article along its curvilinear abscissa, minimizing the bending effects along the Frenet triad opposing to the accommodation of the actual curves of the product, it is possible to actualize the object of letting the slender article to assure a shape according to its unique form, regardless of the torsional angle or of its attitude in the inertial space.

The devised solution consists of a system of supports (vertical constraints) for the bar, suitably designed to meet what is indicated above at the theoretical level. This system, allowing to accommodate the curvatures on two orthogonal planes simultaneously and with the same technique to create the balances, allows the elasticity of the slender article to express freely, so that the article itself, typically a bar, can take its actual shape, leaving all internal tensions neutral. For this reason, the system according to the invention is also called floating system (or 3D Floating System), to emphasize its ability to balance the gravitational effects and leave the multi-planar curvilinear freedom of the article.

More precisely, it is necessary to realize an external interconnected support so that it is possible to realize a set of specific balances. The device is comprised of a set of physical supports made so as to minimize the contact surface, giving also the possibility (sometimes indispensable) of not constraining to rotation the article in the point of support (torsion). In fact, in many cases, an aspect to be examined is the "twist" i.e. the torsion rate of the section along the site of the centres of the article; in this case, the absence or minimization of the torsional constain ensures high accuracy for the detection of the twist.

The support points are mechanically connected to each other through mechanical arms of variable length, which possess the characteristic of being variable in manual or automatic mode, this latter aspect being essential for the perfect balancing of the system. These arms, below referred to as 'primary', in turn possess a particular point, typically midway but changeable if necessary, in which a universal joint mechanism is inserted, leaving to the primary arm two degrees of rotational freedom along two orthogonal axes passing as close as possible to the centre of the article.

In this way, the support points are connected in pairs through said connecting arms. These primary arms are supported in turn by secondary arms having, at their respective ends, connections to the above-mentioned universal joints of the primary arms; preferentially in central position, but possibly also offset, each secondary arm also having a further universal joint with two orthogonal axes passing as close as possible to the axis of the bar or article. Such universal joint serves as a connecting element of the secondary arm level.

The resulting arrangement is substantially a plurality of arm layers which split, with a fractal pattern, the supports; in each support there is a cardan suspension (universal joint) with axes of rotation centred as much as possible in the bar or article to be supported, leaving to the supported arm only two rotational degrees of freedom.

The universal joint is essential to allow the whole support arrangement to accommodate the curvilinear multi-planar trend of the article, without opposing any reaction on two orthogonal planes. The layers can be several and, consequently, can lead to a number of final supports for the article equal to 2^n; in order to avoid leaving a residual degree of rotational freedom, the final ground support (i.e. on fixed reference plane of the machine) of the floating 3D system can be made conveniently in two points. We will then have 4 supports in the case of two layers/levels, 8 supports in the case of three layers, 16 supports in the case of four layers, and so forth.

The number of layers is determined based on the extent of desired fractioning of the article support. It is not ruled out that in some applications it may be sufficient to have only one layer of arms.

In this way, the support scheme develops symmetrically with respect to the centreline of the bar or article to be supported.

A high fractioning is positive in order to minimize the size of the free span, but it is negative for the increase in the mass of support groups, arms and universal joints. Preferably, the correct compromise provides for an optimal number of three layers for metal bars with size of the section from 5 mm to 30 mm and of a length of from 3 to 6 meters, without the mass being such as to reduce the natural frequency of the system too much.

It shall be to emphasize the importance of the universal suspension architecture, which allows to minimize the resistance effect to the free placement in the space of the article because, compared to other known techniques, the support reaction of the article is transferred to the rotational point through an arm which causes friction and unavoidable mechanical resistances to have a minimal effect on the flexural distension freedom of the article. This is an aspect which particularly distinguishes the solution of the invention, as such friction is responsible for accuracy errors inevitably present in the other solutions of the known art. The application of the universal joints as articulation means of the support arms provides a composition of orthogonal planes for sustaining and accommodating natural curvatures of the article causing, inter alia, the article to be possibly placed virtually in the space in any position without the inertial effects affecting the curvature of the same.

The device according to the invention has peculiar characteristics, which are: 1) the compensation of the inertial effects on the bend is independent of the article position in the space, that is independent of the position of the support system and of the twist of the skewed curve of the site of the centres with respect to the support system itself; 2) a correlation between the angles of the various arms connecting the universal joints with the interpolation values of the curvatures along the article; 3) a minimization of friction mechanical effects in the universal joints with respect to bendings of the article; 4) the ability to operate in a direct way with free universal joints and in an indirect way with locked universal joints: in the latter case, the locking torque is a function of the bending moments inside the article when held in the position dictated by the angles imposed on the universal joints.

According to a variant of the invention, the universal joints are therefore of lockable type, namely the axes of rotation are mechanically lockable with a fixed attitude. In this case, stress/strain sensors (such as load cells or similar) are preferably provided, being able to detect the existing stresses around the axes of the universal joints.

All the above aspects allow us to understand how the system works and how this allows to perform extremely accurate measurements of the geometric shape of the article in the following two cases: with free universal joints or with locked universal joints.

In the case of free universal joints, the article can express its geometric curvature leading to the neutral balance its internal tensions, since the universal joint suspension system allows to leave the bending of the article on its curvature planes free, reacting to the weight at the intersecting points of the supports and balancing the two orthogonal components. Applying this system to a geometry-detecting machine, the detection can be carried out through different technical methods. For example, by reading in various positions along the length of the article with common punctual laser or profile reading sensors; through inductive, capacitive or eddy current sensors; the systems without mechanical contact are preferable with respect to the contact reading systems, because the latter entail an unavoidable application of forces altering the shape, compromising the extreme accuracy of the system.

A second possibility is to read the angular position of each rotation in the universal joints, through angle reading sensors such as encoders, resistive readers, inductive readers or other readers commonly available in the art such as the Hall effect ones or eddy current ones.

The two approaches have advantages and disadvantages that can be evaluated as follows: reading through laser systems external to the floating system, especially if movable with extreme straightness guides constrained to granite backbones and/or associated with interferometers for the precise and instantaneous correction of the relative position of measurement, allow a very detailed reconstruction of the deformation with longitudinal resolutions, even millimetric or submillimetric, however introducing the need for additional integrated systems; the measurement through the reading of the universal joint rotations instead allows to maintain an extremely low complexity of the architecture of the machine as a whole, providing the curvature value and mediating the intermediate values among the support points. It has been experimentally found that the latter case is more than sufficient for all quality control and process control activities.

In the case of locked universal joints, the 3D Floating System has all the $2^n$ supports perfectly aligned. At this point, making the article rest on the system, this will exert forces on the supports through its weight and the tensions produced as a result of the elastic tension generated by the difference between the natural curvature and the perfect imposed straightness; its own weight will be counteracted by the symmetrical bending of the arm and will not develop a torque at the universal joint. The restraining reaction of the universal joint locking will then be representative of the bending state as being proportional to the natural curvature. Such torsional information can be obtained by embedding torsion sensors in the universal joint locking system, of which the technique offers many possibilities both as strain gauge sensors and piezoelectric sensors; in this way, it is possible to determine the deformation in a very accurate way through a "post process" of the tensional information by applying an elastic model of the material (knowing the Young's modulus and the inertia of the section). It is to be noted that, also in the case of free universal joint configuration, it is possible, starting from the geometry, to determine the state of the tensile deformation based on the Young's modulus and of the inertia of the section.

In any case, the splitted modular arrangement and the universal joint coupling kinematic are the elements making it possible to perform the measurements, thanks to which it can be said that the accuracy of the system is an intrinsic feature of the same. The precision is then a function of the positional or tensile detection technologies integrated to the 3D Floating System or external thereto and will be chosen according to the expectations of the final application.

The option of using the system in the free or constrained form, making it a "reversible" system, is an important and distinctive feature of the system as it can be used in combination with particularly precise and detailed external laser systems, with integrated internal systems of rotational position or even torque metering systems, such as to make the 3D Floating System also completely autonomous in the measurements.

In terms of performance, it is stressed that the locked universal joint configuration allows measurements to be made with no moving parts and no external measuring instruments. This fact allows to carry out almost instantaneous detections as it is possible to read the torque metric reactions immediately after the bar has been laid down. Elastically coupled mass movements not being present, as in the case of free universal joints, there is no need to wait for the possible damping of oscillations of the article before performing the measurements; in addition, there is no need to wait for the completion of a movable acquisition step, due to the absence of a detecting step by movable systems.

Another advantageous feature of the system is to have the support points of the article on the support arms as described above, while maintaining a degree of translational freedom along the arm itself.

Substantially, at each support point of the floating system, the article is free to slide back and forth along its longitudinal axis.

This is a significant possibility because it allows to maintain this movement constrained through the bar itself and/or through a suitable sleeve constrained to the ground and movable longitudinally. The sleeve allows in this way, with its suitably mobility controlled in an automatic way, to vary the length configurations of the arms. The system is thus also easily reconfigurable in the event of length change of the article to be measured.

That is, it can be provided that each support of the system is vertically slidable within a guide sleeve integral to the fixed reference of the system. The support is however vertically movable in a consistent way with the underlying interconnection arm. The sleeve can be translated along the extension of the arm, possibly with motorization means, varying the application position of the support along the length of the corresponding interconnection arm.

The distribution of the supports along the longitudinal axis of the system is preferably set on the basis of the calculated elastic model of the article, so as to obtain the perfect balancing. This operation can be assisted by a suitably programmed or preset automatic system during the production stage of the system (if it is intended for fixed and predetermined length of articles).

Experiments on the universal joint suspension system confirmed the accuracy expectation expected from theoretical and conceptual considerations. From the tests, it was found that measuring the bars (for example of round section diameter of 10 or 12 mm made of brass, steel or aluminium, with an offset valve of 1.5 mm along about 3 meters of total length), these have shown variations of a few tens of microns with the variation of their rotational position (i.e. torsion in Frenet nomenclature) demonstrating the fact that the measurement is neither influenced by the gravitational bias nor from the kinematics of the universal joint suspensions; thus, the two support orthogonal planes allowed the bar to express its curvatures on osculating natural planes making them rotate rigidly with the rotation of the bar exactly as stated by the fundamental theorem of the curve in space theory.

The support system can also be equipped with an automatic system for measuring the length of the bar and of the position with respect to the axis of symmetry of the floating system, thus allowing processing through the elastic model (knowing the Young's modulus and the inertia of the section) of the correction factors of the measurement for the extrapolation of the real balance shape. The types of the longitudinal position detection can be laser optical or discrete light systems, as well as feeler systems, depending on the desired technical choices.

The mechanical part of the system must be combined with an electronic part for the management and the reading of the sensors, for data processing and storage and possible sharing with third-party line systems. Therefore, data can also be represented in graphic form or stored on mass storage devices, storing raw data and summary data, such as, for instance, the offset on any length, and most commonly in form of mm/m as inspired by the above-mentioned standard. Data can also be represented graphically by successive sections in three-dimensional shape, two-dimensional shape, or with scalar values of numerical synthesis to better represent the information for quality control and process control activities. The system can be completed by automatic handling systems for cooperation and unloading of bars to and from production lines or warehouses.

The system can be equipped with rollers at the contact points with the slender article, for example of the longitudinal type in order to allow the free sliding along the longitudinal axis of the article. This promotes the continuous use of the machine for bars in longitudinal movement or for seamless products. The contact constraint with the supports can also be a two-sided type.

The following will provide a more detailed disclosure with punctual reference to the accompanying figures.

Figures 1A, 1B:
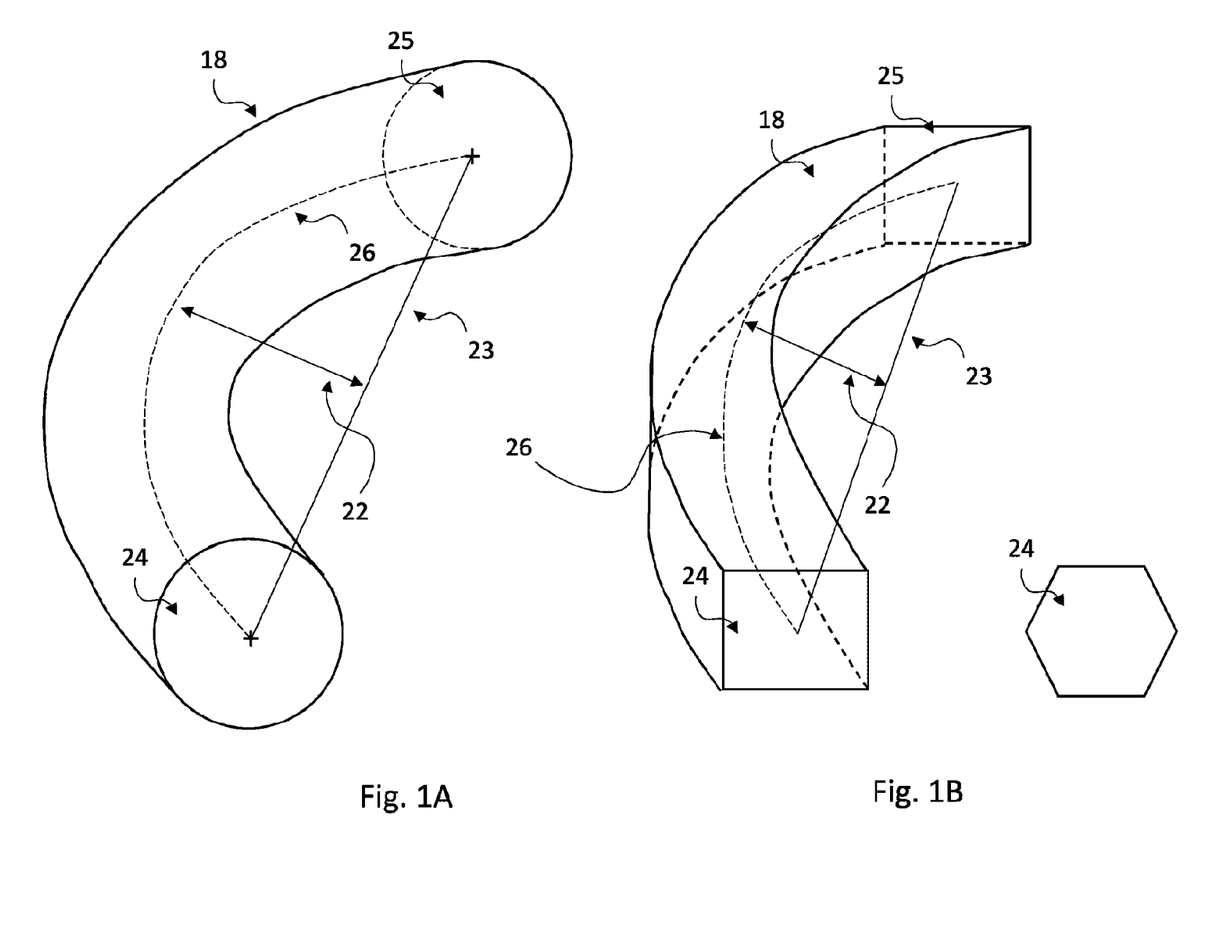
FIGS. 1A and 1B are schematic figures which represent an exemplary slender body, with circular and polygonal cross-section, respectively.

FIGS. 1A and 1B show two exemplary bars 18 which are generically curved, wherein the following are highlighted: the deflection 22, the base line 23, the curvilinear axis 26 of the bar and the terminal sections 24 and 25 of a round, square and hexagonal type. In this representation, the article is seen with a perspective such as to be represented in a compact form; in practice, the typical dimensions are in the order of meters for the references 23 and 26, tens of millimetres for the references 24 and 25 and millimetres for the reference 23.

Figure 2A:
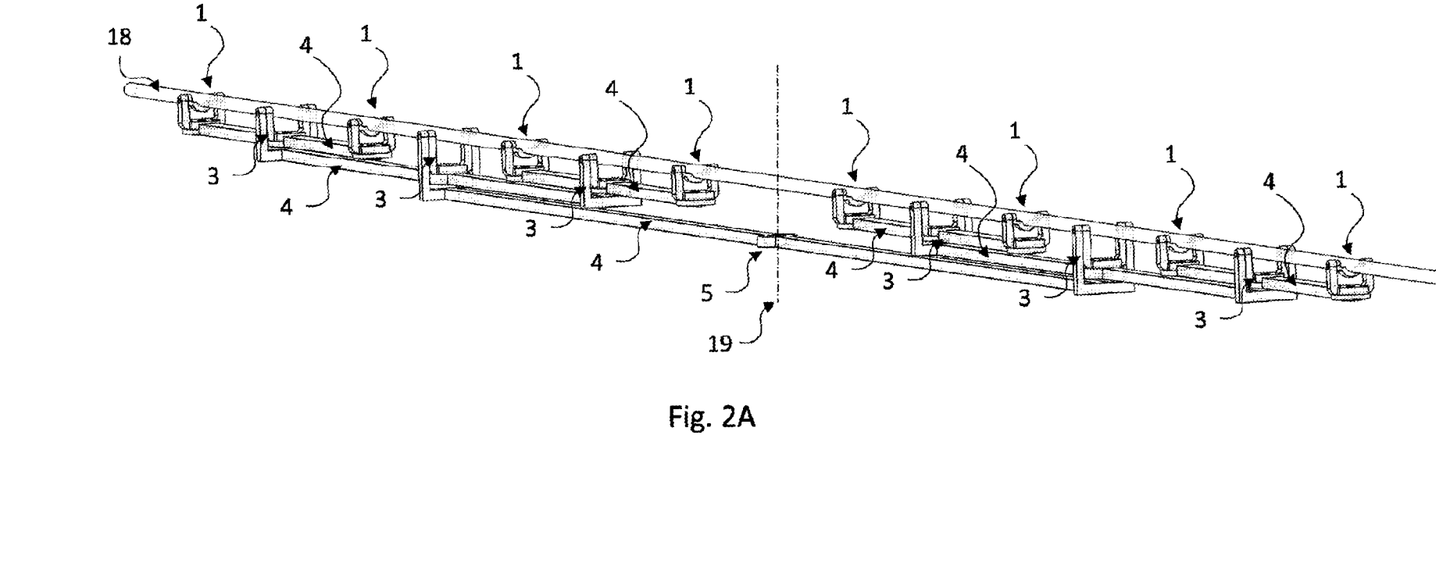
FIGS. 2A and 2B are schematic views, respectively a perspective and exploded view, of a support system according to an embodiment of the invention.
Figure 2B:
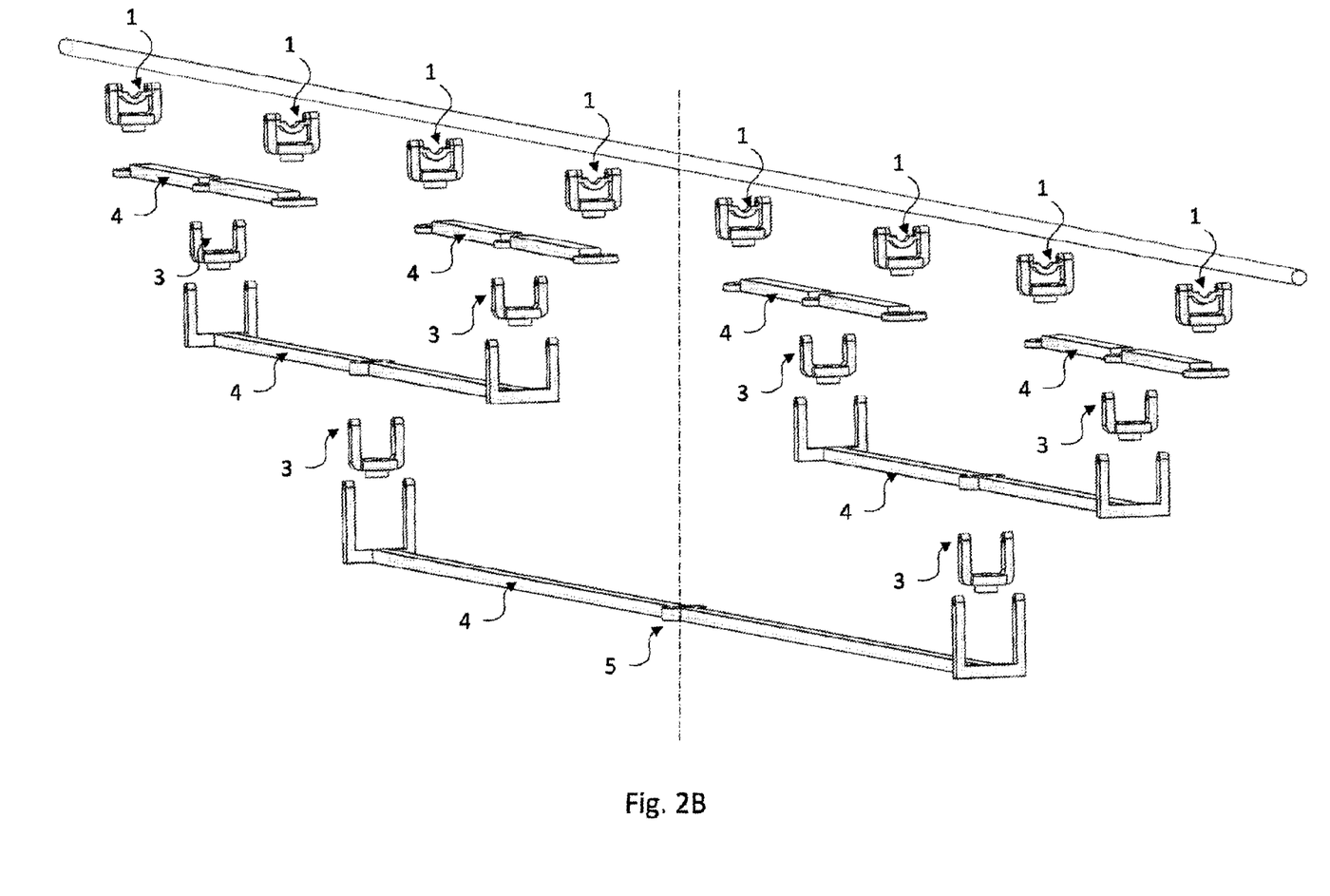

FIG. 2A shows an embodiment of the system, which helps to understand the essential concept of the invention. The bar 18 lies on a system with eight supports 1 and three layers 8/4/2 with joints 3; the joints and the supports are universal joint suspensions connected by arms 4. The point 5 is the constraint point of the last arm to the ground (i.e. to the fixed reference plane of the system). The axis of symmetry 19 of the system is also visible.

FIG. 2A shows more visibly the assembly logic of the parts constituting the universal joint suspensions provided in the support points 1 of the article, in the connection joints 3 between the arms 4 and in the constraint to the ground 5.

Figure 3A:
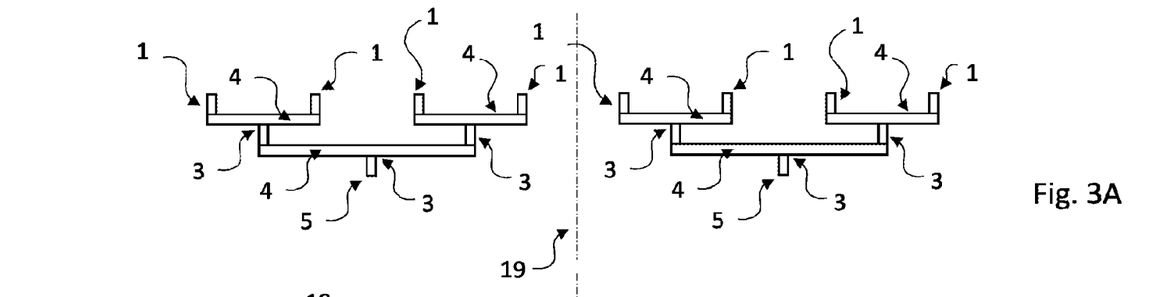
FIGS. 3A, 3B, 3C are schematic side elevational views of the various embodiments of the support system according to the invention.
Figure 3B:
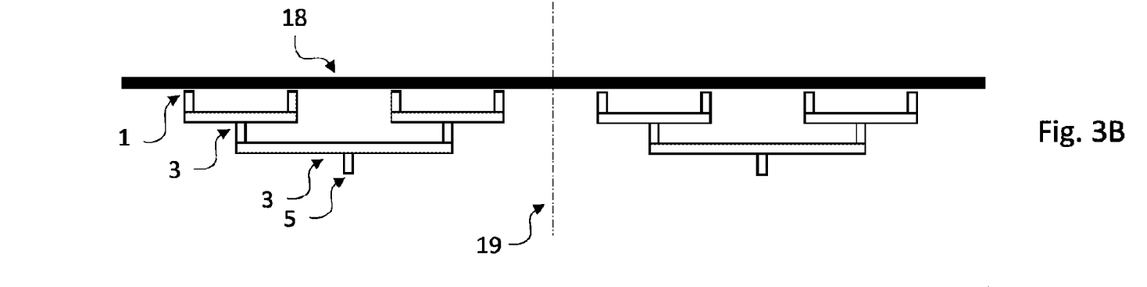
Figure 3C:
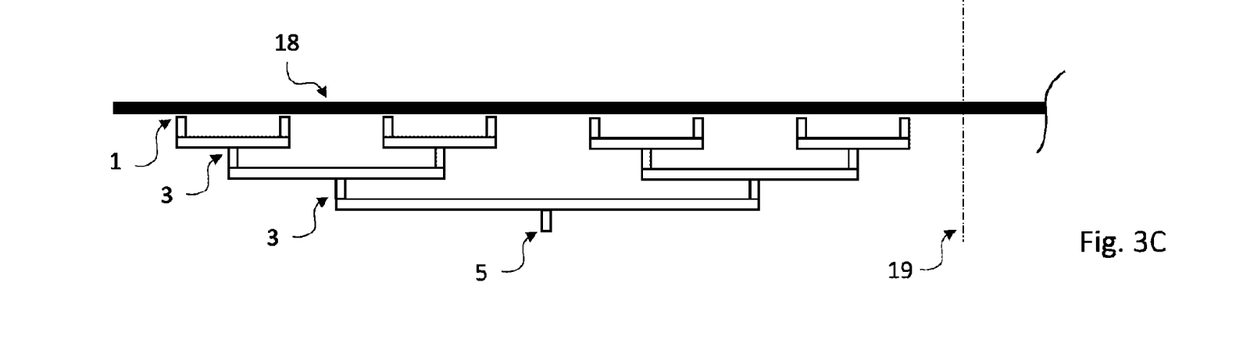

FIG. 3 show a diagram of the support of the article 18 in two cases: with eight supports in FIGS. 3A and 3B, and with sixteen supports in FIG. 3C, respectively. In the latter case, the left part symmetrical to the centre axis 19 is not shown. The support scheme provides a tree-type structure in which the supports 1 at the first layer become four joints 3 in the cases of FIGS. 3A and 3B and eight in the case of FIG. 3C, then becoming two joints 3 in FIGS. 3A and 3B, then constrained to the ground through the supports 5. In the case of FIG. 3C there is an additional layer of four joints, before passing to the last layer with the ground constraints 5. In these representations, it is possible to observe the interconnection elements 4 between the support points 1 and between the joint points 3. The scheme of symmetry with respect to the centreline 19 of the bar is important.

In these figures, the interconnection between the joints of the mechanical type should be noted, wherein hinges must be present in the support 1 and joint 3 points, allowing the free rotations of the interconnection elements 4 (i.e. the arms). The symmetry of the system with respect to the centreline 19 is important; the position of the support points 1 may be non-uniform and the lengths of the interconnecting elements 4 can be variable and controlled through automatic management systems.

Figure 4:
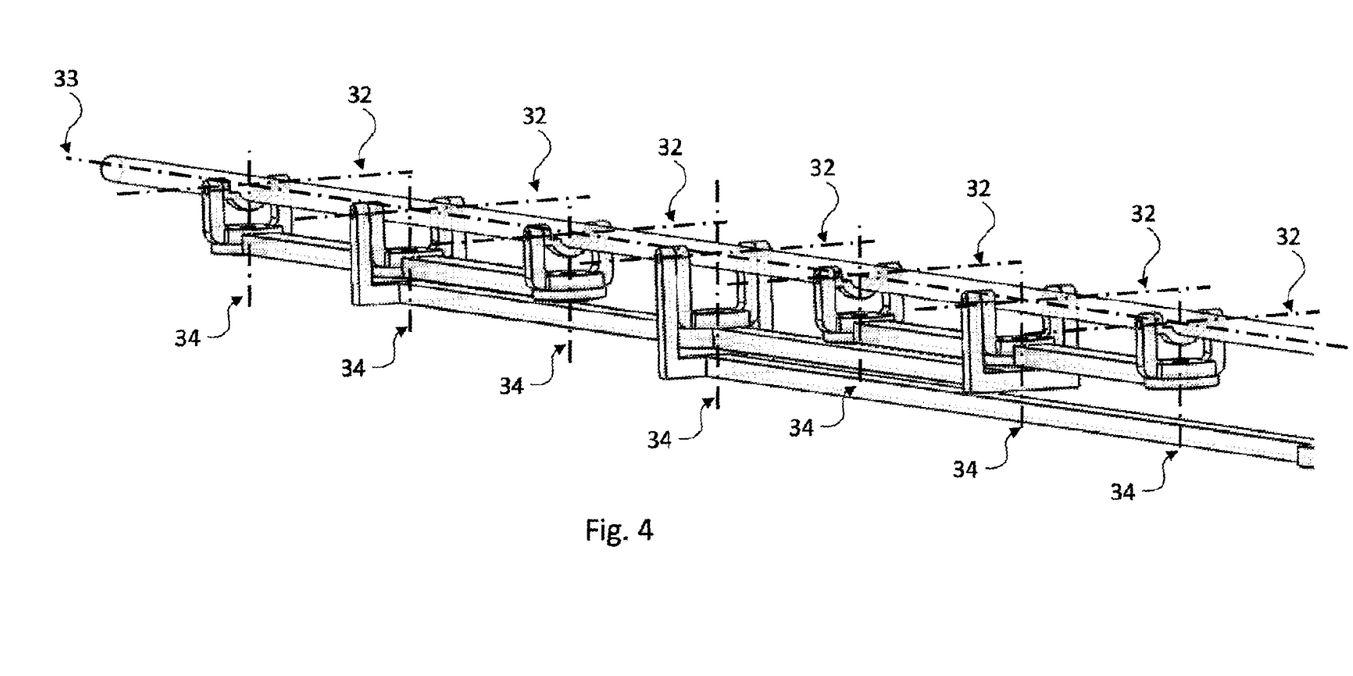
FIG. 4 is a partial enlarged view of FIG. 2A, in which the instantaneous rotation axes are marked.

FIG. 4 shows the axes of rotation of the universal joint suspensions, wherein the two orthogonal axes 32 and 34 and the torsion axis 33 are shown.

Figure 5:
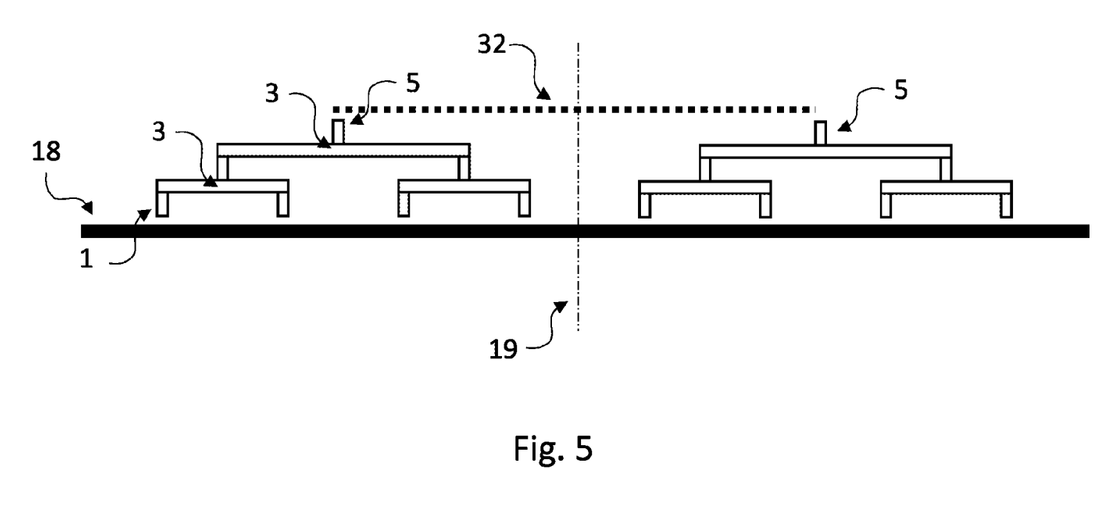
FIG. 5 is a schematic side elevational view of a different system support mode according to the invention.

FIG. 5 shows a different embodiment of the invention, wherein the support system is in an operating configuration, rotated by 180 degrees with respect to the axis of the bar 18. In this case, the vertical constraints are working under tension rather than under compression; i.e. the vertical constraints hang the article from the top, and then are subjected to tension action.

Figure 6:
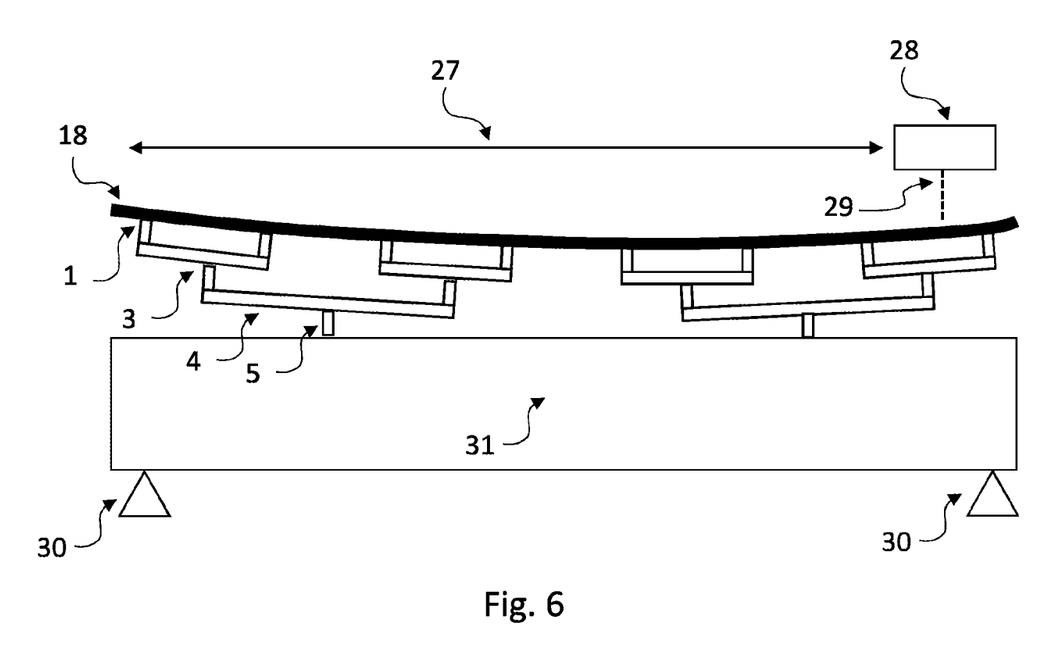
FIGS. 6-7 are schematic elevational side view of various configurations for a geometry-detecting machine using the system according to the invention.

FIG. 6 shows an example of the system applied to a geometry-detecting machine with an arrangement of eight supports 1 wherein the working logic of the interconnection elements 4 being balanced through the rotations in the joints 3 as a result of the constraint-reaction forces on the article is evident. The figure shows the precision axis 27 and the laser sensor able to acquire the measurements along the base line or the curvilinear abscissa. The sensor 28 also has the function of detecting the length and position of the article with respect to the symmetry of the support system, since such information may be useful to process curvilinear correction coefficients to compensate for the lengths and the asymmetry in the positioning. It is also possible to adopt side laser sensors for the detection on the horizontal plane of the article in the form of a bar, especially if associated with the application of the lateral free systems 21.

Figure 7:
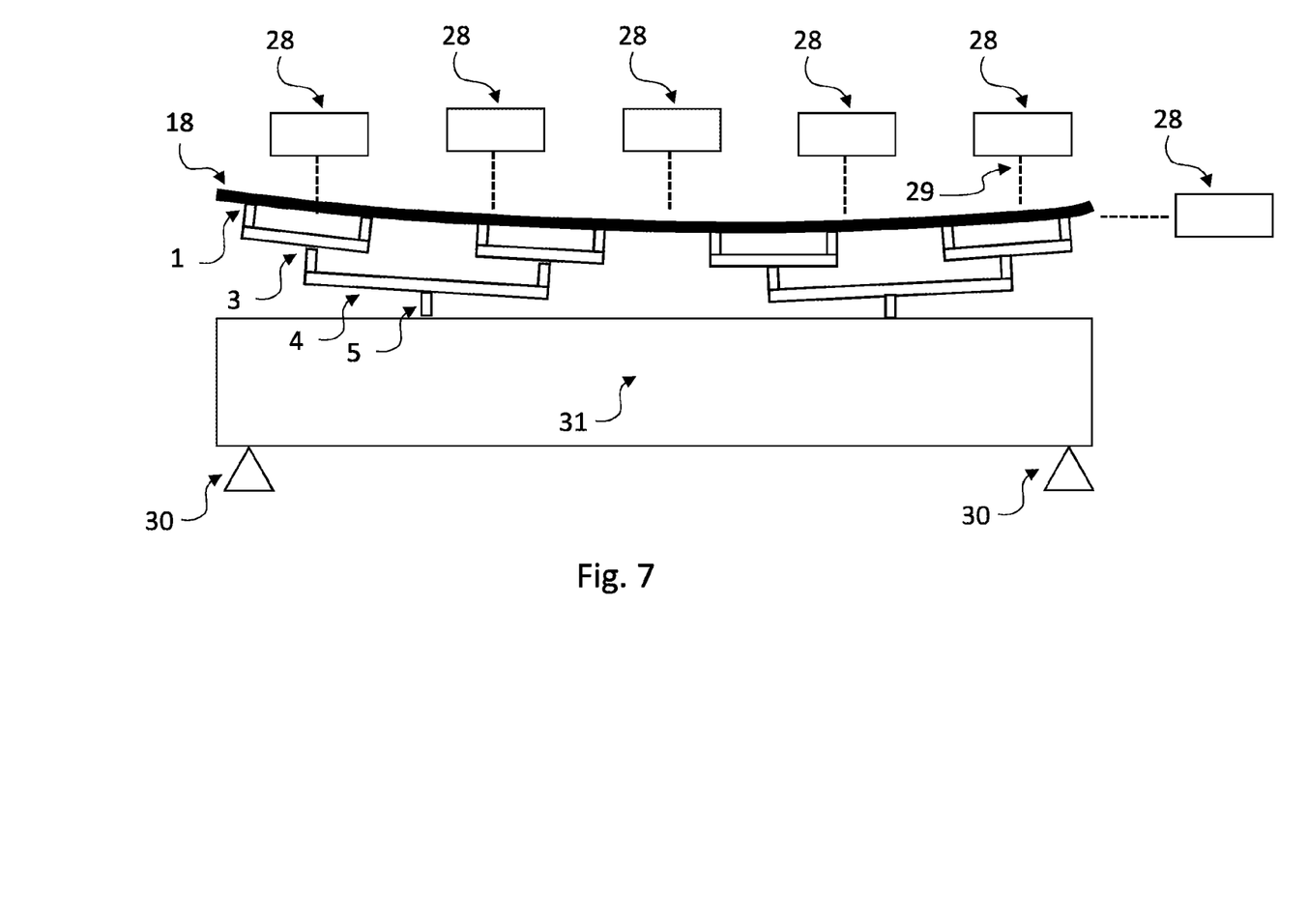

FIG. 7 represents a machine, which is an alternative to that of FIG. 6, wherein fixed sensors of different types (inductive, capacitive, eddy current) are provided on the horizontal plane, on the vertical plane and/or for the axial positioning of the article in the form of a bar.

In special configurations, it is possible to artificially unbalance the balancing arms, in order to rebalance articles not having compliant lengths with respect to the preset configurations. Such unbalance is to be understood as the application of elastic or constants forces to be implemented in the joints in order to rebalance discrepancies between the actual positions of the constraints and the ideal positions. With this logic, it is possible to fit devices which are external to the balancing system for the application of forces to the article, in order to compensate with special logics for the discontinuities at the ends and for the edge effects.

As can be understood from the above disclosure, thanks to the configuration of the invention, it is possible to have a support system of a slender body providing ample freedom of adaptation, so as not to affect the natural geometry during the detection operations of the actual geometric shape.

It is understood, however, that the invention is not to be considered as limited by the particular arrangements illustrated above, which represent only exemplary embodiments of the same, but different variants are possible, all within the reach of a person skilled in the art, without departing from the scope of the invention itself, as defined by the following claims.

The invention claimed is:

1. Support system of a slender article in a geometry detecting machine of the slender article, comprising a plurality vertical constraint supports (1) with which said slender article is in contact with, characterised in that
   said vertical constraint supports (1) are perfectly aligned and consist of locked universal joints, and
   stress/strain sensors are provided, being able to detect the existing stresses around the axes of said locked universal joints
   a restraining reaction of the locked universal joints being representative of the bending state of said slender article as being proportional to its natural curvature,
   deformation of said article being determined in a very accurate way through a "post process" of tensional information by applying an elastic model of the material of said slender article.

2. The support device as in 1, wherein said vertical constraint points (1) leave at least one degree of longitudinal translation freedom to said slender article, so that the slender article is free to slide back and forth along its longitudinal axis.

3. The support device as in 2, wherein the device is equipped with rollers at contact points with the slender article, in order to allow the free sliding along the longitudinal axis of the article.

4. Geometry-detecting machine of a slender article, comprising a frame featuring a support system of the slender article and a geometry-detecting device adapted to detect the geometric shape of the slender article constrained on said support system, characterised in that said support system is as in claim 1.

\* \* \* \* \*